(12) United States Patent
Mcconnell

(10) Patent No.: US 10,927,935 B2
(45) Date of Patent: Feb. 23, 2021

(54) INNER RACE CENTERING WITH FORMED SIDE PLATE

(71) Applicant: SCHAEFFLER TECHNOLOGIES AG & CO. KG, Herzogenaurach (DE)

(72) Inventor: Trevor Mcconnell, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 81 days.

(21) Appl. No.: 16/212,003

(22) Filed: Dec. 6, 2018

(65) Prior Publication Data

US 2020/0182340 A1 Jun. 11, 2020

(51) Int. Cl.
*F16H 41/24* (2006.01)
*F16D 41/066* (2006.01)

(52) U.S. Cl.
CPC ........... *F16H 41/24* (2013.01); *F16D 41/066* (2013.01); *F16H 2041/246* (2013.01)

(58) Field of Classification Search
CPC .. F16D 41/066; F16D 41/067; F16D 41/0665; F16D 41/24
See application file for complete search history.

(56) References Cited

U.S. PATENT DOCUMENTS

| 7,802,668 | B2 | 9/2010 | Peri et al. | |
|---|---|---|---|---|
| 8,371,116 | B2 | 2/2013 | Mueller et al. | |
| 2004/0099498 | A1* | 5/2004 | Kurita | B60N 2/168 192/12 B |
| 2004/0139743 | A1* | 7/2004 | Sato | F16D 41/066 60/345 |
| 2012/0193182 | A1* | 8/2012 | Gurney | F16H 41/24 192/46 |
| 2015/0014119 | A1* | 1/2015 | Berruet | F02N 15/022 192/41 R |
| 2015/0323052 | A1* | 11/2015 | Moore | F16H 41/24 60/364 |

* cited by examiner

*Primary Examiner* — Stacey A Fluhart
(74) *Attorney, Agent, or Firm* — Brooks Kushman P.C.

(57) ABSTRACT

A side plate utilized in a torque converter, comprising a first annular surface, a second annular surface opposite the first annular surface, an outer race defining an outer peripheral of the first and second annular surface, an inner race defining an inner peripheral of the first and second annular surface, and a neck extending axially away from the second annular surface and located along the inner race.

13 Claims, 3 Drawing Sheets

INNER RACE CENTERING WITH FORMED SIDE PLATE

TECHNICAL FIELD

The present disclosure relates to a torque converter and more specifically to a torque converter with a side plate.

BACKGROUND

A side plate may be utilized in a torque converter. A side plate may typically include several lancings circumferentially across a surface of the inner surface of the side plate that are used to center the one-way clutch inner race. However, a side plate as such may have durability issues due to inadequate support of the bearing on the outer surface of the side plate. One solution is to add thickness to the side plate, however, this may add a significant cost to the manufacturing of the side plate.

SUMMARY

According to one embodiment, a torque converter comprises a stator, a one-way clutch including an inner race, an outer race, and one or more rollers, and a side plate, wherein the side plate includes a first annular surface, a second annular surface opposite the first annular surface, an outer race defining an outer peripheral of the first and second annular surface, an inner race defining an inner peripheral of the first and second annular surface, and a neck extending axially away from the second annular surface and located along the inner race, wherein the neck includes a top surface which centers with the one-way clutch inner race.

According to a second embodiment, a side plate is utilized in a torque converter and includes a first annular surface, a second annular surface opposite the first annular surface, an outer race defining an outer peripheral of the first and second annular surface, an inner race defining an inner peripheral of the first and second annular surface, and a neck extending axially away from the second annular surface and located along the inner race.

According to a third embodiment, a torque converter includes a clutch including an inner race and an outer race. The torque converter also includes a side plate that includes a first annular surface, a second annular surface opposite the first annular surface, wherein the second annular surface is in contact with the outer race of the clutch, an outer race defining an outer peripheral of the first and second annular surface, an inner race defining an inner peripheral of the first and second annular surface, and a neck extending axially away from the second annular surface and located along the inner race, wherein the neck includes a top surface in contact with the inner race of the clutch.

DETAILED DESCRIPTION

Figure 1:
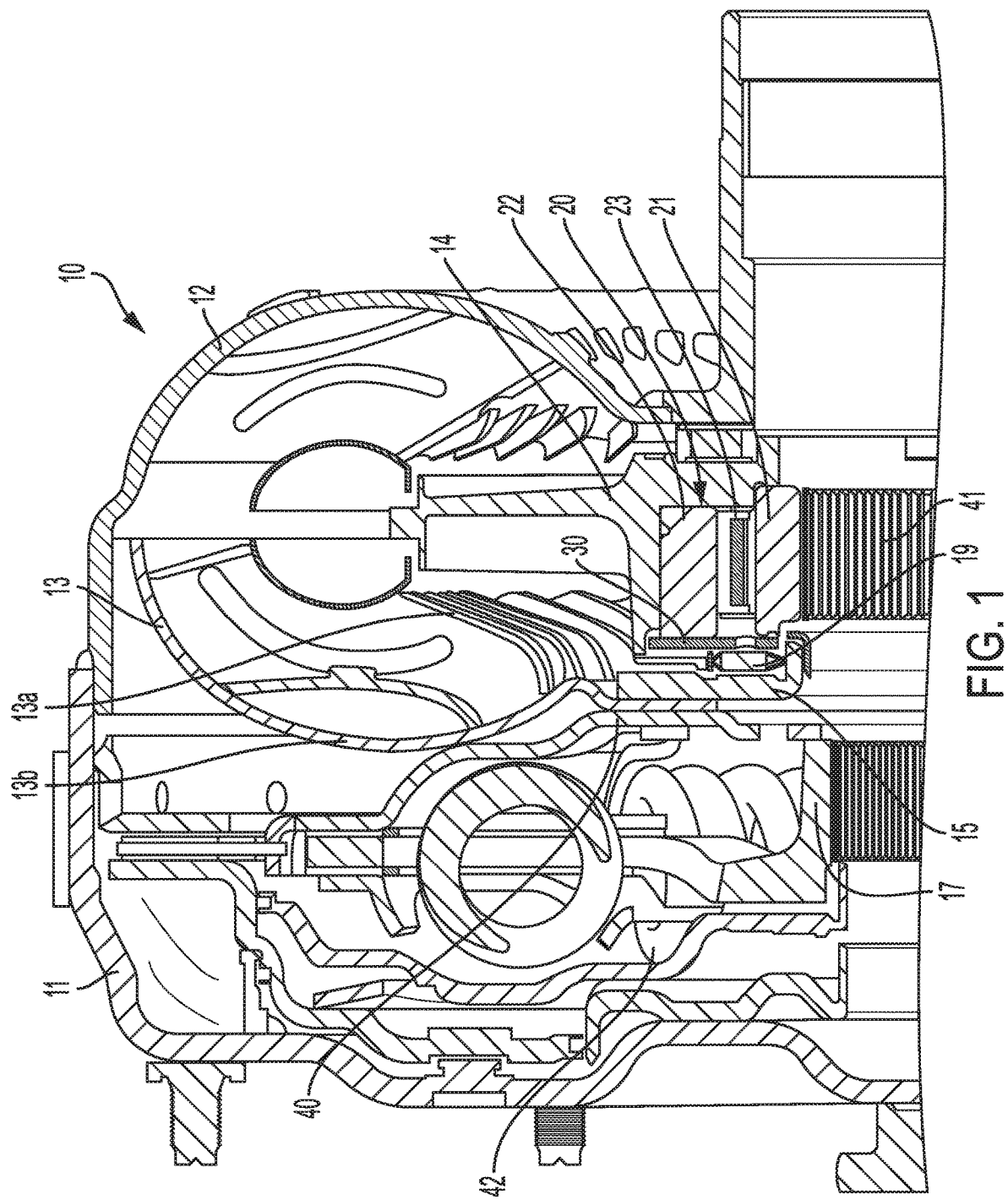
FIG. 1 shows the top-half of a torque converter in a cross-sectional view.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A side plate may be utilized in a torque converter. A side plate may typically include several lancings circumferentially across a surface of the inner surface of the side plate that are used to center the one-way clutch inner ring. However, a side plate as such may have durability issues due to inadequate support of the bearing on the outer surface of the side plate. Previous designs of the side plate may support a load through the bearing with little to support the load. One solution is to add thickness to the side plate, however, this may add a significant cost to the manufacturing of the side plate.

Another solution may be to add lancings. However, lancings can weaken the support for the bearing. Furthermore, by adding additional lancings, the side plate may weaken. For example, additional lancings cannot be continuous around an annular surface of the side plate, as it may create multiple pieces of the side plate, or reduce strength of the side plate due to less material being used in order to create the continuous or near-continuous lancing. Other side plates may have also utilized centering by interacting with the outer race of the clutch. In such solutions, the protrusion of the inner race of the side plate was not in contact or engaged with the side plate. Thus, it may be beneficial to have a side plate that doesn't add additional cost by adding material, but provides additional support to a bearing of the torque converter.

FIG. 1 shows the top-half of a torque converter 10 in a cross-sectional view. The torque converter 10 may be any type of torque converter and is not limited to any type of design. The converter 10 comprises a cover 11 that is connected to an impeller 12. The cover 11 and the impeller 12 together forming a housing. They are connected to each other by welding, for example. The torque converter 10 further comprises a turbine 13 with turbine blades 13a and a turbine shell 13b. A stator 14 is arranged between the impeller 12 and the turbine 13.

The stator 14 is connected to a one-way clutch 20 integrated into the torque converter 10. The one-way clutch 20 comprises an inner race 21, an outer race 22 and rollers 23 in between them. The inner race 21 is connectable to a stator shaft by a spline 41 or the like. The outer race 22 may be press-fit into the stator 14. The stator 14 may be axially positioned by a bearing 19. A side plate 30 may be press-fitted or staked into the stator 14 to fix the one-way clutch 20 to the stator 14. The side plate 30 may be utilized for both centering and for support. The side plate 30 may be in contact with a bearing 19. The bearing 19 may be in contact with an outer surface of the side plate 30. The turbine shell 13b may be connected to a flange 17 via a rivet. The flange 17 may be disposed between cover plates. A spring 42 is in torque flow between the cover plates 40 and flange 17. The flange 17 may be drivingly engaged to an input shaft through the turbine hub 15 by welding, for example. The turbine hub 15 may include a fluid channel for the passage of cooling fluid.

The cover 11 of the torque converter 10 may be connected to a pilot that may include one or more fluid channels. The cover 11 and the pilot may be welded together. One of the pilot's fluid channels may be in fluid communication with a fluid channel of the turbine hub 15 and a fluid chamber. Other fluid channels may be in fluid communication with other fluid chambers.

In a torque converter mode, torque may be received by the cover 11 and then transferred from the impeller 12 to the turbine 13, and multiplied through the stator 14. Torque from the turbine 13 is transmitted to the transmission input shaft via a flange 17. In a torque converter clutch mode, torque may be received by the cover 11 and transferred to the cover plates (e.g. cover plate 40) through spring 42 and a flange 17, to the transmission input shaft.

Figure 2:
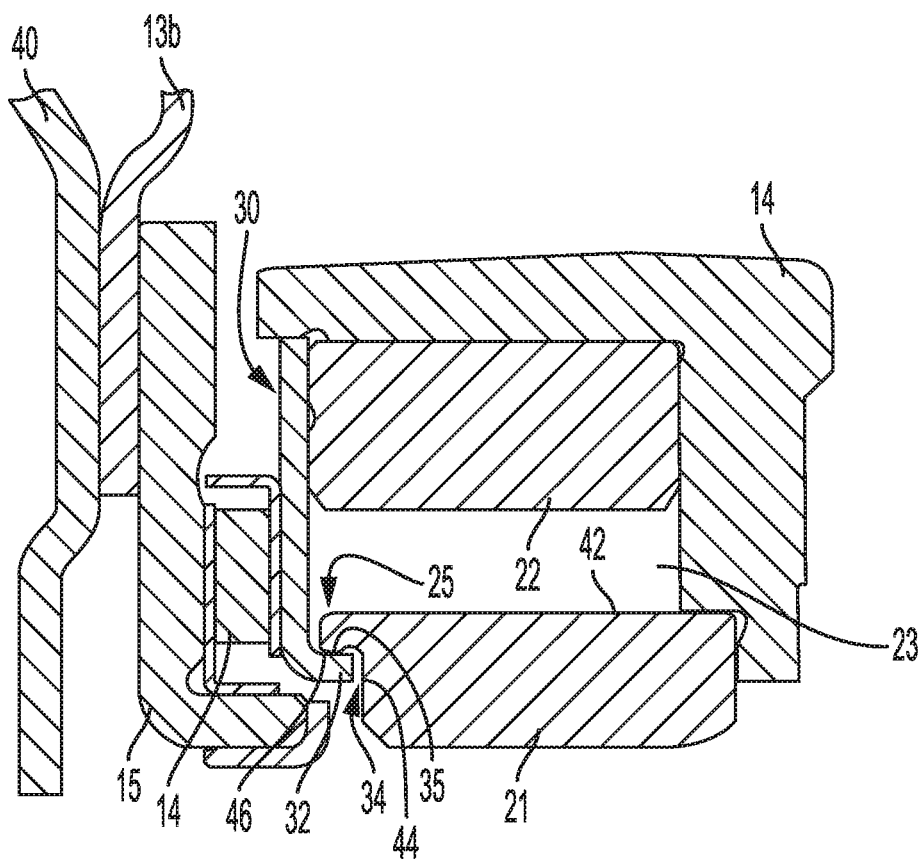
FIG. 2 shows a partial side view of a torque converter showing the side plate.

FIG. 2 shows a partial side view of a torque converter showing the side plate. The side plate 30 may be in contact with several different components of the torque converter 10. For example, the side plate 30 may be staked against a stator of the torque converter. Anti-rotation tabs may be included as protrusions extending radially outward of the outer race of the side plate 30. The anti-rotation tabs may or may not be staked into the stator 14. The anti-rotation tabs may be utilized to prevent the side plate from rotating.

The side plate 30 may have a modified inner race. The modified inner race may be utilized for centering the clutch and the side plate. The modified inner race may include a neck that is added to support the one-way clutch 20. As shown in FIG. 2, the neck 32 may support the one-way clutch 20 at the inner race 21 of the clutch. The inner race 21 includes a protrusion 25 extending axially towards the side plate 30. The protrusion 25 may be continuous with an outer surface 42 of the inner race 21. The protrusion 25 defines a recess 44. The neck 32 of the side plate 30 may become in contact with the protrusion 25 of the inner race 21 and be received within the recess. The top surface (radial outer surface) 35 of the neck may be in contact with a bottom surface (radially inner surface) 46 of the axially extending protrusion 25 of the inner race of the clutch. However, the neck 32 may not be in contact with the top surface of the axially extending protrusion 25 of the inner race of the clutch.

At an opposite side of the side plate may be a bearing 19. The side plate 30 may also support the bearing 19. The outer diameter surface of the side plate 30 may be in contact with the bearing 19. Thus, the side plate 30 may function as support for the bearing, as well as be utilized to center the clutch 20.

Figure 3:
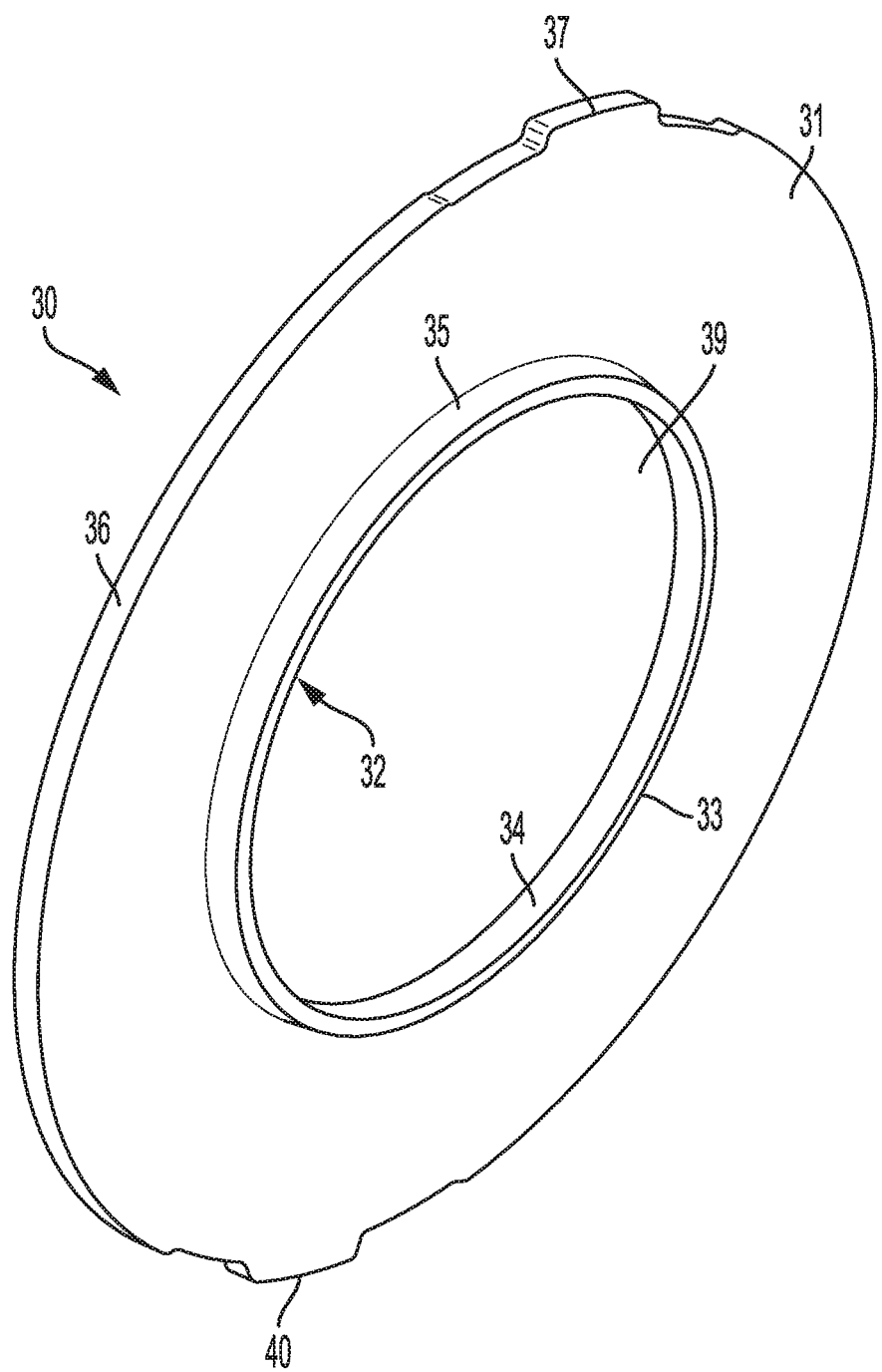
FIG. 3 shows a perspective view of a side plate according to one embodiment.

FIG. 3 shows a perspective view of the side plate 30. The side plate 30 may be one utilized in a torque converter. The side plate may include a first and second annular surface. The second annular surface 31 may not include any perforations or lancings in one embodiment. An first annular surface (not shown in FIG. 3) may be opposite the second annular surface 31. The side plate 30 may include an outer race 36 defining an outer peripheral of the side plate 30 and the first and second annular surface. The side plate 30 may also include an inner race 33 that defines an inner peripheral of side plate 30 and the first and second annular surface.

The side plate 30 may include a neck 32 that extends axially away from the second annular surface 31. The neck 32 may be circumferentially located along the inner race 33. The neck 32 may include a top surface 35 and a bottom surface (radially inner surface) 34. The neck 32 is annular as are the surfaces 34 and 35. The surfaces 34 and 35 may be smooth circular surfaces. The top surface 35 of the neck 32 may be formed from part of the second annular surface 31 of the side plate 30. The bottom surface 34 of the neck 32 may be formed from part of the first annular surface (not shown) of the side plate 30. The top surface 35 of the neck 30 may be integral with the second annular surface 31, while the bottom surface 34 of the neck 30 may be integral with the first annular surface. Thus, the top surface 35 may abut with the second annular surface 31 and the bottom surface 34 may abut with the surface of the neck 30.

The side plate may include a hole 39 that is defined by the inner race 33 and concentric about the side plate 30. The hole 39 is larger than the diameter of the spline 41. The neck 32 may be made from the same material as the second annular surface 31 or the first annular surface, as it may be formed by machining or forging the side plate 30. The neck 32 may provide additional support to the bearing 19, while still maintaining the functionality and ability to center the one-way clutch 20. The side plate 30 may also include anti-rotation tabs 37 that protrude radially outward at the outer race 36 and are used to prevent the side plate 30 from spinning.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

PARTS LIST

The following is a list of reference numbers shown in the Figures. However, it should be understood that the use of 10 torque converter
11 cover
12 impeller
13 turbine
13a turbine blades
13b turbine shell
14 stator
15 turbine hub
17 flange
19 bearing
20 one-way clutch
21 inner race of clutch
22 outer race of clutch
23 rollers of clutch
30 side plate
31 second annular surface
32 neck
33 inner race
34 bottom surface of neck
35 top surface of neck
36 outer race
37 anti-rotation tabs
39 hole
40 first cover plate
42 spring

What is claimed is:

1. A torque converter, comprising:
a stator;
a one-way clutch including an inner race connectable to a stator shaft, an outer race fixed to the stator, and one or more rollers disposed between the inner and outer races, wherein the inner race has an axially extending protrusion that is continuous with an outer circumferential surface of the inner race, the axially extending protrusion having an inner circumferential surface defining a recess on an axial face of the inner race; and
a side plate including a first annular surface, a second annular surface opposite the first annular surface, an outer surface extending between the first and second annular surfaces, an inner surface defining a central hole through the first and second annular surfaces, and a neck extending axially away from the second annular surface and encircling the central hole, wherein the neck is annular and includes a radially inner circumferential surface continuous with the inner surface of the side plate and a radially outer circumferential surface, the neck being received within the recess and configured such that the radially outer circumferential surface of the neck engages with the inner circumferential surface of the axially extending protrusion to center the side plate to the clutch.

2. The torque converter of claim 1, wherein the inner race defines an internal spline having a diameter that is smaller than a diameter of the central hole.

3. The torque converter of claim 1, wherein the second annular surface is in contact with the outer race of the clutch.

4. The torque converter of claim 1, wherein the side plate includes one or more anti-rotation protrusions extending radially outward from the outer surface of the side plate and in contact with the stator.

5. The torque converter of claim 1, wherein the first annular surface of the side plate is in contact with a bearing adjacent with and in contact with a turbine hub.

6. The torque converter of claim 1, wherein the side plate is not in contact with the one or more rollers.

7. The torque converter of claim 1, wherein the neck and the axially extending protrusion are configured to rotate relative to each other.

8. The torque converter of claim 1, wherein the radially inner circumferential surface and the radially outer circumferential surface of the neck are smooth.

9. The torque converter of claim 1, wherein the side plate is not in contact with the axially extending protrusion of the inner race of the clutch.

10. A torque converter, comprising:
a stator clutch including an inner race connectable to a stator shaft, an outer race, and rollers riding between the inner and outer races, wherein the inner race defines an axially extending protrusion; and
a side plate connected to the stator clutch and including:
a first annular surface,
a second annular surface opposite the first annular surface, wherein the second annular surface is in contact with the outer race of the clutch,
an outer edge defining an outer periphery of the first and second annular surface, and
a neck extending axially from the second annular surface, wherein the neck is annular and includes a radially inner circumferential surface and a radially outer circumferential surface configured to engage with the axially extending protrusion to center the side plate to the clutch.

11. The torque converter of claim 10, wherein the axially extending protrusion is continuous with an outer circumferential surface of the inner race.

12. The torque converter of claim 10, wherein the axially extending protrusion defines a recess on a face of the inner race that receives the neck therein.

13. The torque converter of claim 10, wherein the neck and the axially extending protrusion are configured to rotate relative to each other.

* * * * *